Patented Dec. 13, 1927.

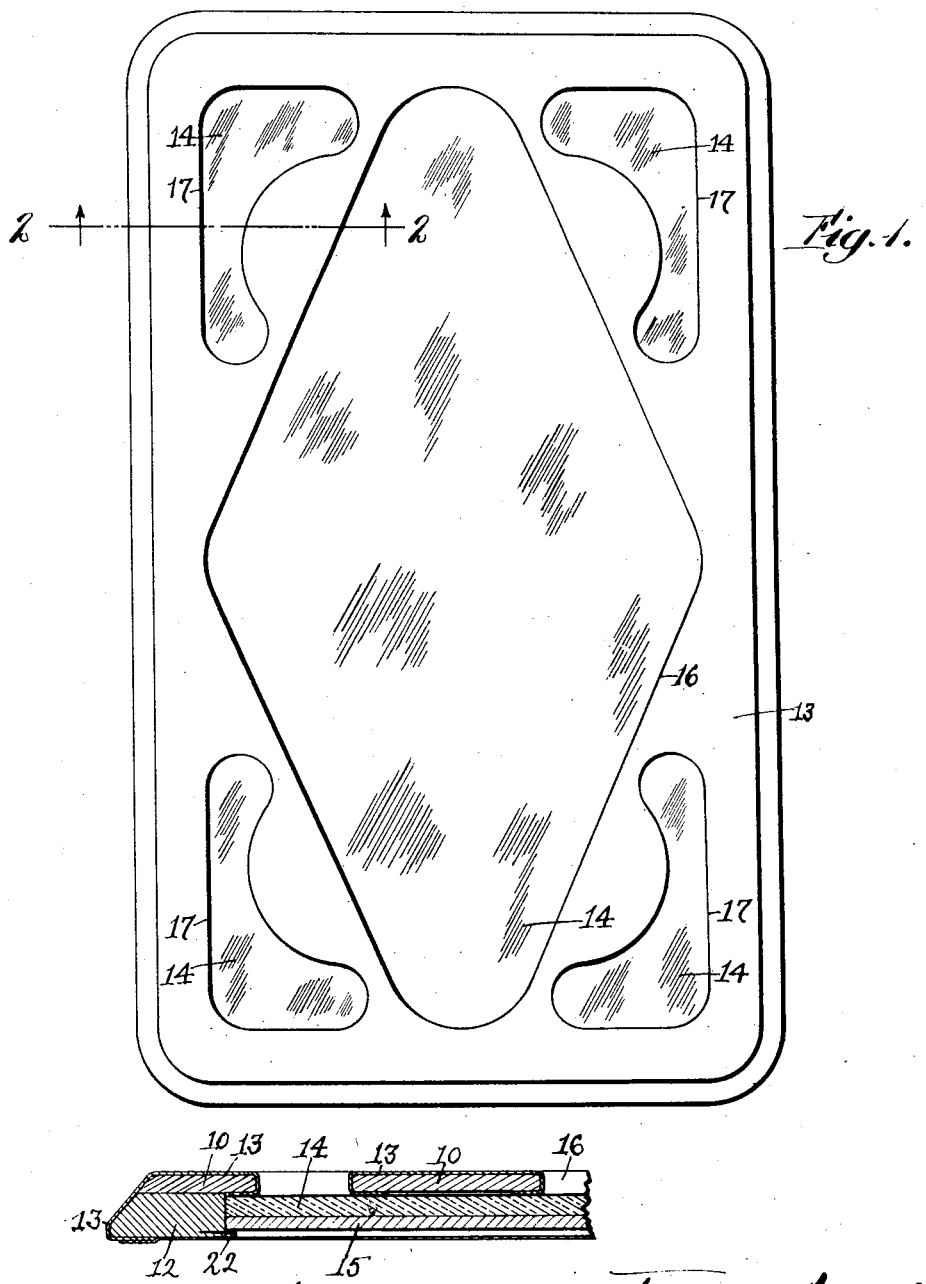

1,652,678

UNITED STATES PATENT OFFICE.

MATTHEW A. NATHANSON, OF BOSTON, MASSACHUSETTS.

MIRROR.

Application filed April 17, 1926. Serial No. 102,766.

This invention relates to a mirror and particularly to the frame for the glass of the mirror, and has for its object to provide a frame of wood, plaster board or like relatively inexpensive material with a plurality of openings forming a design in the face of the mirror, and an ornamental covering for the frame which is applied to the frame so as to form a continuous, unbroken and smooth surface on the outside of the frame and to cover the walls of the openings in the latter.

The frame is provided with a front or facing member composed of a single piece or layer of wood, or like material, which is cut out to provide a main opening and a plurality of smaller openings distributed over the facing member to impart a distinctive design or ornamental appearance, and said facing member is glued or otherwise attached to a rear member or molding, within which the glass of the mirror is located.

The covering member for the frame is made from a single piece of leather, either natural or artificial, plush, cloth or the like, which is provided with openings corresponding to the openings in the face member of the frame, and which is glued or otherwise secured to the rear side of the face member and molding so as to provide a seamless or continuous covering for the front surface of the mirror frame and for the walls of the openings therein.

The glass may be supported by a backing or filler member suitably secured to the frame.

The particular features of the invention will be pointed out in the claims at the end of this specification.

Fig. 1 is an elevation of a mirror embodying this invention, and

Fig. 2, a detail in section taken on the line 2—2, Fig. 1.

Referring to the drawing 10 represents the front or facing member and 12 the rear member or molding of the frame; 13 the covering member; 14, the mirror glass, and 15, the backing member for said glass.

The facing member 10 of the frame is made of a single piece or layer of wood, plaster board or like relatively inexpensive material, and is cut out by a jig saw or in any other suitable manner to provide the facing member with a relatively large opening 16, which may be designated the main opening through which the greater portion of the glass 14 is exposed, and to provide a plurality of smaller openings 17, which may be designated auxiliary openings whose walls are integral with the facing member 10, and through which a plurality of smaller limited areas of the glass 14 are exposed.

The auxiliary openings 17 may be made of any desired shape to impart distinctive and ornamental design effects to the mirror, and in the present instance four auxiliary openings 17 are provided, one at each corner of the facing member 10, which latter is made substantially oblong in shape.

It is, however, not desired to limit the invention to a facing member of this particular shape or to the particular shape and number of the auxiliary openings.

The facing member 10 is glued or otherwise secured to the open frame or molding 12, into which the glass 14 is placed so as to bear against the facing member 10, and in which it is confined by the backing or filler member 15, which may be secured in the molding or open frame 12 by brads 22 or otherwise.

The facing member 10 is provided with the covering member 13, which may be a sheet or layer of leather, plush or other fibrous material, which is provided with openings corresponding to the openings 16, 17 in the facing member 10, and which openings in the covering member 13 are such that the portions of the covering member bordering the openings therein may be folded over the edges or walls of the openings in the facing member 10 and engaged with the rear surface of said facing member 10.

The covering member 13 is also preferably made large enough to be folded over, the outer sides or edges of the molding or open frame 12 and engaged with the rear surface of the latter.

The covering member is stretched or smoothed out to present a smooth exterior surface not only on the front face of the facing member 10, but also on the walls or edges of the openings 16, 17 therein and also on the edges or sides of the molding or open frame 12.

It is preferred to secure the covering member 13 to the mirror frame by glue or other adhesive or cementitious material which will contain sufficient moisture to render the covering member sufficiently moist to enable it to be stretched so as to enable it to be applied to the mirror frame and be free from wrinkles and thereby present a smooth, finished appearance.

When leather, either natural or artificial, is used as the covering member, it is preferred to employ a leather having its exterior surface colored in design.

By making the facing member 10 from a layer or sheet of stock, such as wood, plaster board or the like, and cutting out portions thereof to form the main and auxiliary openings, the walls of said openings are integral with the facing member, and a strong and durable frame is produced at a minimum cost, which when covered as described and provided with a mirror glass forms an attractive and novel mirror.

What I claim is:

1. A mirror having a frame composed of a one-piece facing member provided with a main and auxiliary openings, an open molding to which said facing member is attached, a covering member of fibrous material of greater length and width than said open molding and provided with openings corresponding to the openings in said facing member, said covering member being secured to the latter and to the said molding to cover the exterior surface of said facing member, the walls of the openings therein, and the outer edges of the said facing member and said molding, a mirror glass within said molding, and means for securing said mirror glass in said molding.

2. A mirror frame composed of a one-piece facing member provided with a main and an auxiliary opening, an open molding to which said facing member is attached, and a covering member of fibrous material of greater length and width than said open molding and provided with openings corresponding to the openings in said facing member, said covering member being cemented to the front face of the facing member, to the walls of the openings therein, to the outer edges of said facing member and molding, to the rear surface of the latter and to the rear surface of the facing member adjacent to the openings therein.

3. A mirror frame composed of a one-piece facing member provided with a main and an auxiliary opening, an open molding to which said facing member is attached, and a covering member composed of a layer of fibrous material provided with openings corresponding with the openings in said facing member, said covering member affixed to the exterior surface of said facing member, to the walls of the openings therein, and to the side edges of said facing member and molding.

4. A mirror frame composed of a facing member provided with a main and an auxiliary opening, and a molding to which said facing member is attached, a one-piece covering member of fibrous material provided with openings corresponding to the openings in the said facing member and secured to the latter to cover the exterior surface thereof, a single mirror glass fitted into said molding and co-operating with the openings in the facing member to form a plurality of mirrors, and means for securing said mirror glass to said mirror frame.

In testimony whereof, I have signed my name to this specification.

MATTHEW A. NATHANSON.